O. BOLAND.
Kneading-Machine.
No. 197,540. Patented Nov. 27, 1877.
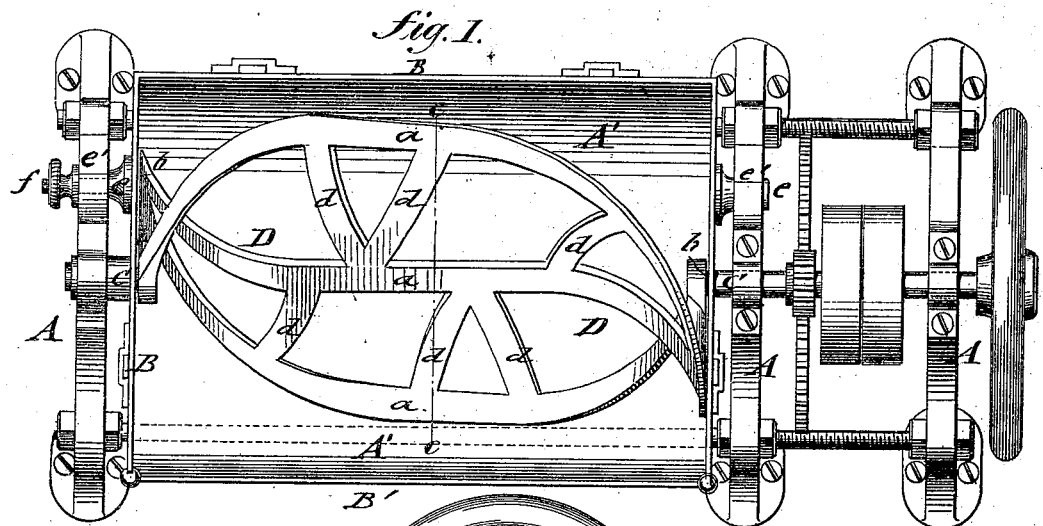
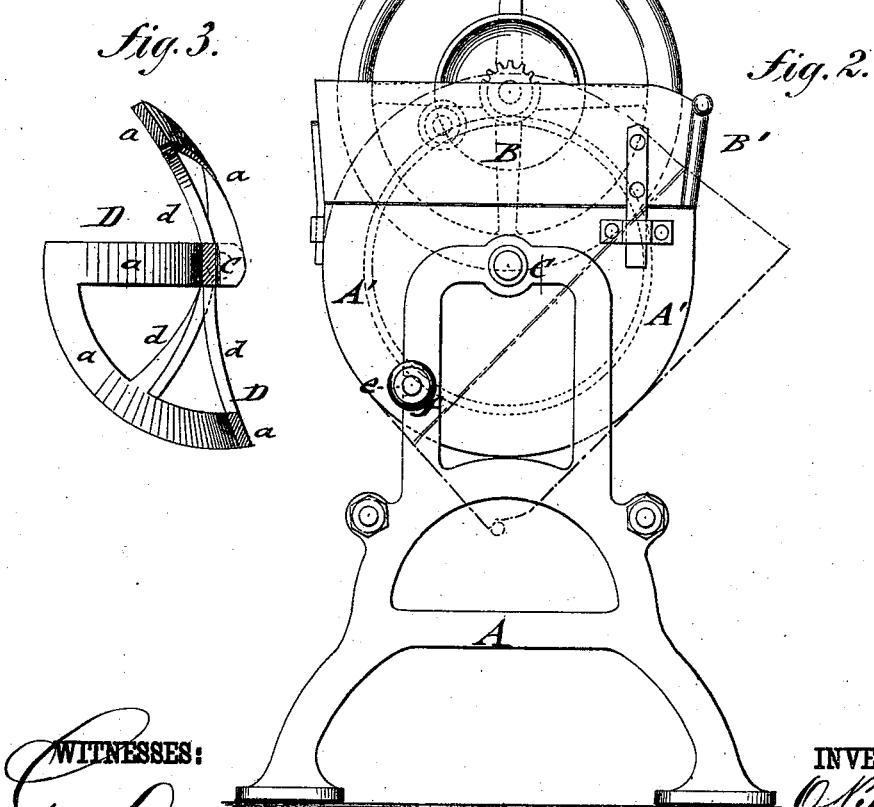
WITNESSES:
Gustave Dieterich
J. H. Scarborough
INVENTOR:
O. Boland
BY Munn & Co
ATTORNEYS.

UNITED STATES PATENT OFFICE.

OVIDE BOLAND, OF PARIS, FRANCE, ASSIGNOR TO EUGENE L. TOURET, OF SAME PLACE.

IMPROVEMENT IN KNEADING-MACHINES.

Specification forming part of Letters Patent No. 197,540, dated November 27, 1877; application filed August 3, 1877.

*To all whom it may concern:*

Be it known that I, OVIDE BOLAND, of Paris, France, have invented a new and Improved Kneading-Machine, of which the following is a specification:

In the accompanying drawings, Figure 1 represents a top view; Fig. 2, a side elevation of my improved kneading-machine; and Fig. 3, a vertical transverse section on line $c\,c$, Fig. 1, through the revolving kneader.

Similar letters of reference indicate corresponding parts.

The invention relates to an improved power kneading-machine for large bread, cracker, and other establishments, chocolate and other factories, by which the dough or other mass is thoroughly and rapidly mixed in superior and effective manner.

The invention will first be described in connection with the drawing, and then pointed out in the claims.

By reference to the drawings, A represents the supporting-frame, to which the semicircular vessel or trough A' is hung by being placed on the short shafts C of the kneader or mixer D.

The short shafts C extend only from the side walls of the vessel A' outwardly, and turn in suitable journal-boxes of frame A, the opening in the walls of the trough being packed in suitable manner, to prevent any entrance of oil from the shafts to the interior of the trough, and the mixing and injuring of the dough or other mass by the same.

Between the short shafts C extends the mixer or kneader D, which is formed of three arms or blades, $a$, of which the central one, of S shape, is straight at the middle, and in line with the axis of the shafts, while the ends are curved spirally to the ends of fixed radial arms $b$, that extend one from each shaft, but in diametrically opposite direction to each other.

The remaining two blades $a$ extend from the ends of the arms $b$, respectively, to the inner but opposite ends of the shafts C, the middle curved parts running along the inner surface of the receptacle, while the outer ends are curved spirally, but in opposite directions to their respective terminal points.

The central and side blades of the kneader are braced transversely by two or more connecting arms or blades, $d$, according to the size of the machine, the blades imparting the required strength to the outer mixing-blades.

The radial arms $b$ are beveled from their backs to the front edge, so as to cut easier through the dough, and prevent any settling between the arms and the side walls of the receptacle.

The kneader D is revolved by hand, steam, or other power, according to the work to be performed, the power being transmitted, by a hand crank-wheel, belt and pulley, and intermediate gearing, or otherwise, to one or both of the short shafts outside of the trough.

The trough A' is provided with a detachable guard-extension, B, that is applied to stays, entering sockets or bands on the trough, the extension having a sliding gate, B', to readily remove the dough or mass by taking out the gate and tilting the trough.

The trough swings on the shafts for tilting, but is secured, during the working of the kneader, by projecting side arms or pins $e$, entering recesses $e'$ on the frame A, and rigidly clamped by a fastening screw or screws, $f$, in this position.

The revolving blades take up the mass near the center and ends of the trough, and conduct it, by the double spiral curves of the blades, continually from one side to the other, and drop it axially by the lifting action of the blades, exerting a powerful kneading influence, that thoroughly mixes and stirs the parts, and does away with the slow and fatiguing hand-kneading of dough and other substances.

Having thus described my invention, I claim as new and desire to secure by Letters Patent—

1. In a kneading-machine, a revolving kneader or mixer, constructed of short end shafts, and of spirally-curved and braced blades, that connect the shafts and the ends of fixed arms, which extend in radial but diametrically-opposite directions from the shafts, substantially in the manner specified.

2. A revolving kneader or mixer, constructed of short end shafts, with beveled arms extending radially but in diametrically-opposite directions therefrom, and of three spirally-curved and transversely-braced blades, of which the middle blade extends from the end of one of the arms along the axis of the shafts to the end of the opposite arm, while the outer blades extend from the ends of the shafts, respectively, to the outer ends of the opposite arms, substantially as and for the purpose described.

OVIDE BOLAND.

Witnesses:
F. ARNEY,
LOUIS d'HONDTE.